(12) United States Patent
Yanovsky

(10) Patent No.: US 7,627,116 B2
(45) Date of Patent: Dec. 1, 2009

(54) RANDOM DATA METHOD AND APPARATUS

(75) Inventor: Eli Yanovsky, Haifa (IL)

(73) Assignee: King Green Ltd., Haifa (IL)

( * ) Notice: Subject to any disclaimer, the term of this patent is extended or adjusted under 35 U.S.C. 154(b) by 283 days.

(21) Appl. No.: 09/800,719

(22) Filed: Mar. 8, 2001

(65) Prior Publication Data

US 2002/0037078 A1 Mar. 28, 2002

Related U.S. Application Data

(63) Continuation of application No. 09/791,686, filed on Feb. 26, 2001.

(60) Provisional application No. 60/245,144, filed on Nov. 3, 2000, provisional application No. 60/234,939, filed on Sep. 26, 2000.

(51) Int. Cl.
*H04L 9/00* (2006.01)

(52) U.S. Cl. ............... 380/46; 380/44; 713/168; 713/171

(58) Field of Classification Search .......... 380/44, 380/46, 267–268, 37, 277; 713/168–171, 713/181; 726/2–3, 27–30
See application file for complete search history.

(56) References Cited

U.S. PATENT DOCUMENTS

| | | |
|---|---|---|
| 3,866,217 A | 2/1975 | Bennett, Jr. |
| 4,771,429 A | 9/1988 | Davis et al. |
| 4,907,232 A | 3/1990 | Harper et al. |
| 5,003,598 A * | 3/1991 | Kunstadt ............ 380/270 |
| 5,253,294 A * | 10/1993 | Maurer ............ 380/264 |
| 5,627,894 A | 5/1997 | Albert et al. |
| 5,703,948 A | 12/1997 | Yanovsky |
| 5,778,069 A | 7/1998 | Thomlinson et al. |
| 6,266,413 B1 * | 7/2001 | Shefi ............ 380/46 |
| 6,445,794 B1 * | 9/2002 | Shefi ............ 380/46 |
| 6,460,055 B1 * | 10/2002 | Midgley et al. ............ 707/204 |
| 6,745,326 B1 | 6/2004 | Wary |
| 2002/0120669 A1 | 8/2002 | Yanovsky |

OTHER PUBLICATIONS

Jung et al. Encryption with Statistical Self-Synchronization in Synchronous Broadband Networks, Springer-Verlag, 1999.*
Kolata "The Key Vanishes : Scientist Outlines Unbreakable Code", The New York Times on the Web, 2001.
Lyman "Unbreakable Code Said to Leave Hackers 'Helpless'", Newsfactor com, 2001.
Official Action Dated Oct. 9, 2007 From the US Patent Office Re.: U.S. Appl. No. 09/791,686.
Official Action Dated Aug. 12, 2004 From the US Patent Office Re.: U.S. Appl. No. 09/791,686.
Official Action Dated Jan. 16, 2007 From the US Patent Office Re.: U.S. Appl. No. 09/791,686.

(Continued)

*Primary Examiner*—Hosuk Song

(57) ABSTRACT

A random data generator for reproducing a random data stream producible by an identical generator at another location, comprising: an input means for receiving a bit stream, a random selector for selecting random individual bits from said bit stream to form a random data stream, and wherein said random selector is randomized by a previous segment of said random data stream. The generator allows process running at two separate locations to make use of the same random data.

31 Claims, 15 Drawing Sheets

OTHER PUBLICATIONS

Official Action Dated Oct. 17, 2008 From the US Office Action Re.: U.S. Appl. No. 09/791,686.
Official Action Dated Apr. 19, 2005 From the US Patent Office Re.: U.S. Appl. No. 09/791,686.
Official Action Dated Jan. 25, 2008 From the US Patent Office Re.: U.S. Appl. No. 09/791,686.
Official Action Dated Mar. 29, 2006 From the US Patent Office Re.: U.S. Appl. No. 09/791,686.

* cited by examiner

FIG. 3
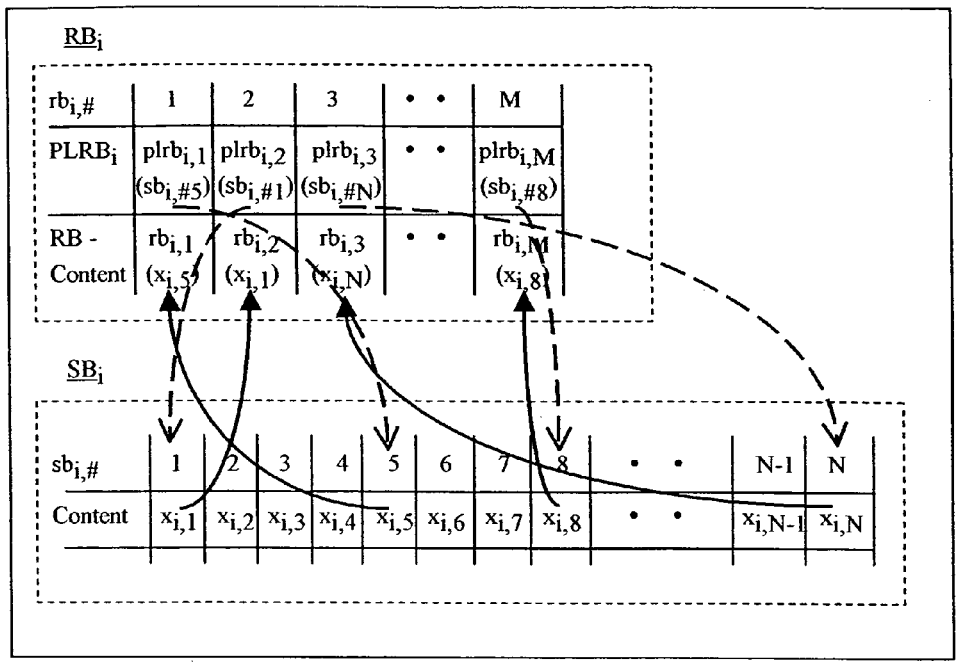
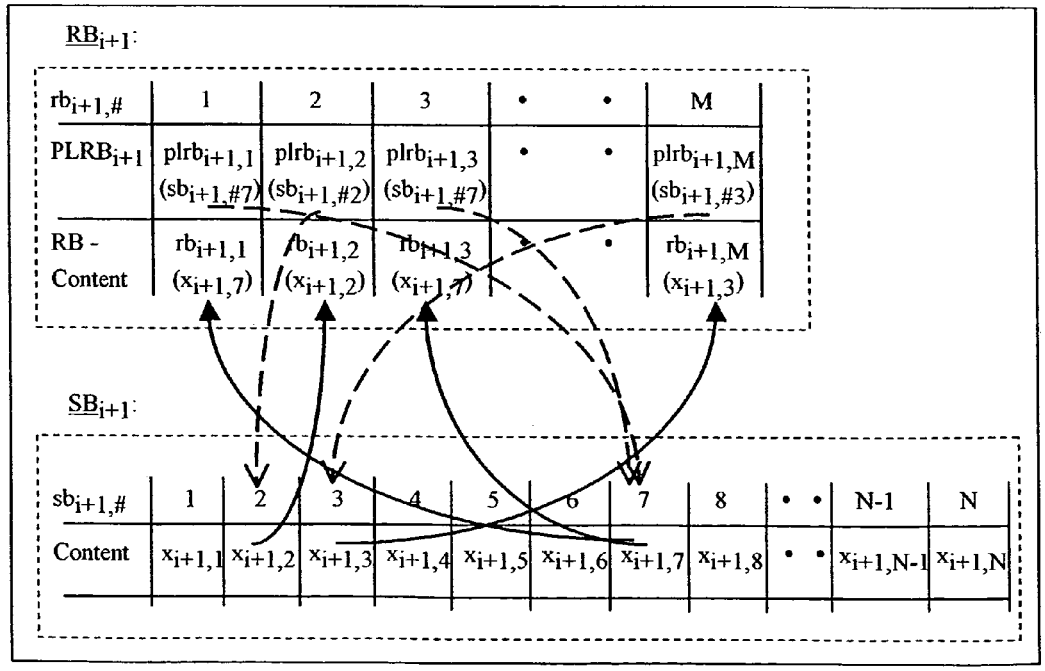

FIG. 16

| Area | BU in Memory | Dominant | | Slave | |
|---|---|---|---|---|---|
| | | Control Snt | BU Use | Control Rcv. | BU Use |
| Sure | Current | Curr | Current | N.M | Current |
| Pre-1 | Current | Curr | Current | Curr | Current |
| | | | | Nxt | Next1 |
| Pre-2 | Current | Nxt | Next1 | Curr | Current |
| | | | | Nxt | Next1 |
| Post | Next | Nxt | Next | N.M | Next |

RANDOM DATA METHOD AND APPARATUS

RELATIONSHIP TO EXISTING APPLICATIONS

The present application is a continuation of U.S. Ser. No. 60/234,939 filed Sep. 26, 2000, U.S. Ser. No. 60/245,144 filed Nov. 3, 2000 and U.S. Ser. No. 09/791,686 filed Feb. 26, 2001.

FIELD OF THE INVENTION

The present invention relates to a method and apparatus for the provision of random data and more particularly but not exclusively to a practical method and apparatus for providing identical random data in a confidential manner to parties connected via an open network.

BACKGROUND OF THE INVENTION

Random data is useful in a variety of applications, some of which include weather forecasting, pricing of futures and chaos-theory based simulations in general, probability-based mathematics, access control, secure communications including cryptography and steganography, and cryptanalysis. Randomness is thus an important tool in science and technology.

In certain of the above applications, it is preferable for two separate parties to have simultaneous access to the same random data, and in many applications it is preferred to make such random data available in large quantities and/or in a consecutive manner. The two parties may be connected over an open network such as the PSTN (Public Switched Telephone Network) or the Internet or over a public radio network, and it may thus be further desirable that other users of the network do not have access to the same random data. An example of such an application is a secret key data encryption method, in which both parties need access to the same random secret keys. A further example is an access control system in which random data is used to provide a password to restrict access to a given facility. In all of these cases the security of the system relies upon the fact that only authorized parties, being at least two in number, have access to the random data.

Now, random data cannot be created simultaneously and separately at the two parties because if identical random data is generated simultaneously at two locations then it is by definition not random. If the random data is generated at one party and transmitted to the other party then it is vulnerable to interception by unauthorized parties.

Currently, two approaches are used. A first approach is to generate the random data at one of the parties and then either send it manually to the other party, for example by special courier, or by encrypting it and sending it electronically over the open lines.

A second approach is to have an identically set pseudo-random number generator (PRNG) at each party and one party sends a seed to the other party to start PRNG at the same 'starting point'. A PRNG produces a stream of data which conforms to statistical measures of randomness, i.e. it may look like white noise, but if given an identical starting point will in fact produce an identical stream.

The current approaches are thus believed to lack efficiency (manual sending of the random data) or lack security (transmission of a seed or encryption of data using an encryption system, which by definition has to rely on a shorter key than the data itself) or lack randomness (reliance on PRNG).

Any improved approach to the problem would be required to supply identical random data to remote sites so that remote simultaneous use of the random data may be made. Furthermore, such supply must be confidential. Moreover, it is not sufficient that simultaneity and confidentiality are available. The two users must be convinced that they are synchronized, and that they are synchronized with each other and with no-one else. Furthermore, the parties must be able to regain synchronization in a secure fashion which they can trust and which does not permit admittance of eavesdroppers.

The above requirements are difficult to fulfill because of the so-called Byzantine agreement problem, which may be stated as follows:

Two remote armies, A and B, approach from different directions to besiege a powerful city. Neither army alone is powerful enough to overcome the city and should it appear on the battlefield alone it will be destroyed. Only if both armies appear simultaneously and from opposite directions is there any chance of success.

The overall commander, located with army A, has to co-ordinate an attack, but has at his disposal dispatch riders as his only means of communication.

The overall commander thus sends a message to the commander of Army B, by dispatch rider, which conveys time of and directions for the intended attack. However, having sent the message by a courier, the commander of army A cannot be certain that the message has reached its destination, (and if it has, that it has not been tampered with on the way). Thus, logic dictates that he will not attack, due to his instinct for self-preservation.

Having received the message, the commander of Army B is faced with the same problem, he cannot be certain that the content of the message is real and that it indeed comes from his ally. It could be a false message sent by the enemy and intended to lure him to his destruction. Furthermore, he knows that commander A has an instinct for self-preservation which is no less real than his own. Thus he must assume that A will not attack and hence he too, does not attack.

Furthermore, he knows that his ally, the commander of army A, will be faced with the same dilemma when receiving his acknowledgement and is unlikely to launch an attack on the basis of this information. Army B, in any case sends back to Army A an acknowledgment message, of the time of and directions for of the attack. Army A receives the acknowledgement but also cannot be sure that the acknowledgement is genuine and has not been sent by the enemy to lure them to their destruction. Furthermore, A knows of B's instinct for self-preservation. Bearing this in mind, army A must assume that army B will not attack. The situation is not improved however many further rounds of acknowledgement or confirmation are carried out. That is to say, having sent the acknowledgment message, both army A and army B keep facing the same dilemma of not being able to assume that the other will attack and, as a result, an attack will never be launched.

The "Byzantine Agreement Problem", is a logical dilemma that is relevant when translated into modem communications, especially when considering for example, open communication modes such as the Internet, which are exposed to hackers, imposters etc. and to errors and breaks in communications.

The issues that this logical dilemma presents, and need to be solved are (i) synchronization; (ii) simultaneity; (iii) identification; and (iv) authentication.

At the basis of the problem lies the fact that at any given step, one party knows less than the other, and there is a lag between the knowledge of the parties (about the situation of one party in regard to the other party, and in their mutual understanding)

The Byzantine agreement problem thus raises the following issues, synchronization, simultaneity, identification and authentication. The root of the problem is that at any given leg of the communication procedure, one party leads and one party lags, even if by nanoseconds, thus leading to scope for dispute and for impersonation.

The depth of the problem may be demonstrated by illustrating two approaches that have been used in attempted solutions in the past. 1) Clock timing synchronization. Each party has an identically set clock. A parameter changes at predetermined clock settings. Unfortunately the two clocks cannot be set so accurately with respect to one another that no dispute occurs at any time. Even a difference of nanoseconds can lead to dispute over some of the data. 2) Synchronization by announcement. A parameter change is made upon receipt of a predetermined announcement. Unfortunately, this approach begs the very essence of the Byzantine agreement problem, since I do not know whether the other side has received the announcement, or whether it originates from a legitimate source at all.

There is thus a widely recognized need for, and it would be highly advantageous to have, a simple and practical way to produce identical ongoing randomness at seperate and remote locations, that is confidential by nature and which enables a mode of communication, synchronization or authentication between two parties that is not vulnerable to the logical dilemmas of the Byzantine agreement problem.

A limited solution, limited to encrypting messages between parties, is to be found in U.S. Pat. No. 5,703,948 which uses state machines to produce pseudo-random keys for the encryption of messages between parties.

SUMMARY OF THE INVENTION

According to a first aspect of the present invention there is thus provided a system for sharing a random process between at least two separate parties, the system comprising at each party:

a primary bitstream, and a selector for randomly selecting parts of the primary bitstream to form a random bit source, wherein each selector is operable to use the random bit source to randomize the selection operation in an identical manner.

Preferably, the primary bitstream is obtainable as a stream of bits from a data exchange process between the two parties.

Preferably, the bits in the primary bitstream are separately identifiable by an address, and wherein the selector is operable to select the bits by random selection of addresses.

Preferably, each selector comprises an address generator and each address generator is identically set.

Preferably, each address generator is operable to make use of a random bitstream to randomize the addresses generation.

A preferred embodiment preferably comprises a controller for exchanging control data between the parties to enable each party to determine that each selector is operating synchronously at each party.

Preferably, the control data includes any one of a group comprising:

redundancy check data of at least some of the bits from the random bit source, and a hash encoding result of at least some of the bits from the random bit source.

Preferably, the control data includes any one of redundancy check data of at least some of the addresses, and a hash encoding result of at least some of the addresses.

Preferably, the selector further comprises a resynchroniser operable to determine from the control data that synchronization has been lost between the parties and to regain synchronization based on a predetermined earlier part of the output of the random bit source.

A preferred embodiment further comprises a backup data exchanger for exchanging the data for regaining synchronization.

Preferably, the resynchronizer further comprises a backup data storage for storing previously exchanged data for regaining synchronization to be used for resynchronization with a party that has not made the exchange.

Preferably, the resynchronizer is operable to create in advance future data to be used for resynchronization for resynchronizing with a party that has made the exchange in advance.

According to a second aspect of the invention there is provided a random data generator, comprising an input means for receiving a bitstream, a random selector for selecting random individual bits from the bitstream to form a random data stream, wherein the random selector is randomized by a previous segment of the random data stream.

According to a third aspect of the present invention there is provided a random data generator for reproducing a random data stream producible by an identical generator at another location, comprising an input means for receiving a bitstream, a random selector for selecting random individual bits from the bitstream to form a random data stream, wherein the random selector is randomized by a previous segment of the random data stream.

Preferably, the bitstream is at least part of a data exchange process between parties associated with the generators.

A preferred embodiment preferably comprises a synchronization check unit for adding data to the data exchange process to enable a remote party to determine that it is producing an identical random data stream.

A preferred embodiment preferably comprises a resynchronization unit operable to use for resynchronization a predetermined earlier part of the random data stream upon receipt of an indication that the random data generator is not producing a random data stream that is identical to one being produced by the remote party.

Preferably, the resynchronization unit is operable to signal to the remote party upon carrying out the resynchronization.

Preferably, the resynchronization unit is operable to exchange the predetermined earlier part at predetermined intervals.

A preferred embodiment is operable to define a gray area around the exchange point, and within the gray area, to exchange control signals with the remote party to ensure that the parties use the same predetermined earlier part.

According to a fourth aspect of the present invention there is provided a method for sharing a random process between at least two separate parties, comprising the steps of:

obtaining at each party a primary data stream, and randomly selecting parts of the primary data stream to form a random data source, and using the random data source to randomize the selection operation in an identical manner at each party.

Preferably, the primary data source is obtainable as a stream of bits from a data exchange process between the two parties.

Preferably, the primary data source comprises a stream of data bits divisible into data units and comprising the step of selecting at random from the data bits of each data unit.

Preferably, the bits in the data units are separately identifiable by an address, and comprising the step of selecting the bits by random selection of addresses.

Preferably, the step of selecting is carried out by using identically set pseudorandom data generation at each party.

A preferred embodiment of the present invention further comprises the step of exchanging control data between the parties to enable each party to determine whether they are operating synchronously with the other party.

Preferably, the control data includes any one of a group comprising:

redundancy check data of at least some of the random data source, and a hash encoding result of at least some of the random data source.

A preferred embodiment comprises the further steps of determining from the control data that synchronization has been lost between the parties and regaining synchronization based on a predetermined earlier part of the random data source.

A preferred embodiment comprises a step of exchanging the data for regaining synchronization A preferred embodiment comprises a step of storing previously exchanged data for regaining synchronization to be used for resynchronization with a party that has not made the exchange.

A preferred embodiment comprises a step of creating in advance future data to be used for resynchronization for resynchronizing with a party that has made the exchange in advance.

BRIEF DESCRIPTION OF THE DRAWINGS

For a better understanding of the invention and to show how the same may be carried into effect, reference will now be made, purely by way of example, to the accompanying drawings.

With specific reference to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 3 is a simplified diagram illustrating a random data production procedure comprising two consecutive random processes of the kind shown in FIG. 2.

FIG. 8, is the same in structure as FIG. 7 but whereas FIG. 7 illustrates random process i, FIG. 8 illustrates random process i+1, thus illustrating the consecutive manner of the preferred embodiments.

FIG. 16 shows in tabular form a protocol for ensuring that parties successfully resynchronize and allowing for the possibility that the parties may not be in the same resynchronization state.

DESCRIPTION OF THE PREFERRED EMBODIMENTS

Figure 1:
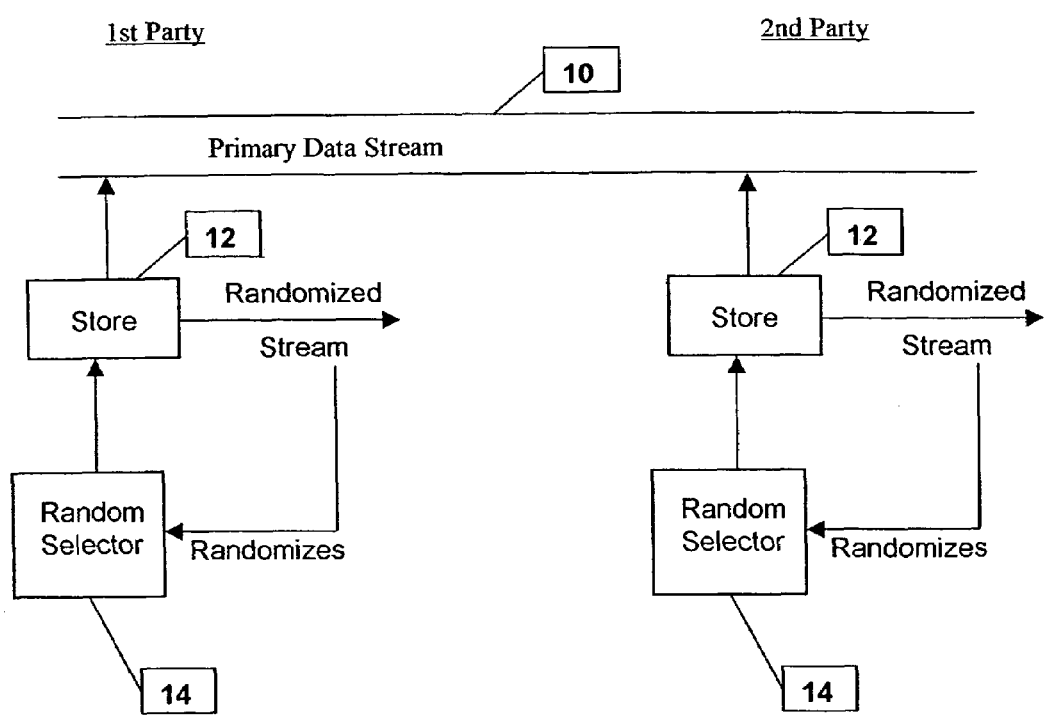
FIG. 1 is a generalized diagram showing a simplified embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The embodiments to be described hereinbelow comprise a way of providing genuine random data at two or more separate locations, the random data having a single source but nevertheless being provided confidentially to each of the locations in such a way that it is not available to eavesdroppers. Furthermore, the embodiments allow a randomness session between the two parties to be resumed if synchronization is lost without falling foul of the Byzantine agreement problem. Resynchronization is preferably carried out using data already used in earlier parts of the randomness sessions and which has thus proved itself to be in the domain of the other party.

Reference is now made to FIG. 1, which is a generalized diagram showing a simplified embodiment of a system for sharing a random process between at least two separate parties, operative in accordance with a first embodiment of the present invention. In the embodiment of FIG. 1, a primary data stream 10 is available to at least two parties. At each party is a store 12 for holding a primary data stream. The store may be a temporary buffer or a more permanent type of store.

Each party has a selector 14 for randomly selecting parts of the primary data stream to form a random data source. As shown, each selector 14 is operable to use the random data source to randomize the selection operation. Thus it is ensured that the at least two parties produce an identical random source despite the fact that they are remote and acting independently.

Figure 2:
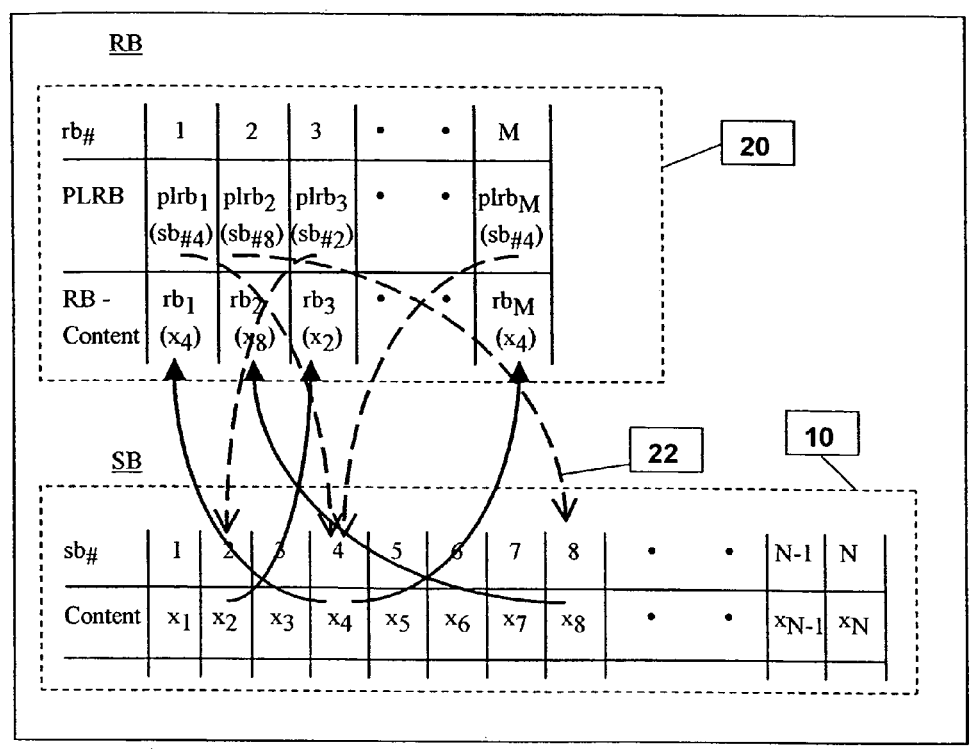
FIG. 2 is a simplified diagram of a process for the production of a random data stream according to a first preferred embodiment of the present invention.

Reference is now made to FIG. 2 which is a simplified diagram of a process for the production of a random data stream according to a first preferred embodiment of the present invention. In FIG. 2, a datastream 10 comprises a plurality of bit positions 1 . . . N, each bit position containing a bit (0 or 1) $x_1 \ldots x_N$. A random bit selector 20 selects M bits from the datastream 10 to form a random bit stream. The random bit selector 20 preferably comprises a first row rb# indicating a bit position in the thus—formed random bit stream. A second row PLRB indicates a selected address (position) in the initial bitstream 10 and the third row contains the content of the random bit selected from the position in the bitstream 10.

The random process illustrated in FIG. 2 may be considered as a computerized analog of a simple "select M balls from N" process. As will be appreciated, in place of colored balls, the random process illustrated in FIG. 1 uses bits (0 or 1).

The random process may be described as follows:

Given a sequence (stream) 10 of N bits, each bit having a numbered position in the stream—sb#—meaning that the stream bits are ordered and numbered 1.-. N, each bit has a content—$x_1, x_2, , x_{N-1}, x_N$ which may be either 0 or 1.

The datastream 10, comprising N ordered stream bits, is preferably confined to a domain defined by the broken lines shown to surround the box 10 in FIG. 2.

Thus for example, we may take a datastream 10 comprising the following 8 ordered stream bits (N=8) 1,0,0,0,1,1,0,0 meaning that the content of stream bit number 1 is 1, the content of stream bit number 2 is 0, the content of stream bit number 3 is 0, the content of stream bit number 4 is 0, the content of stream bit number 5 is 1 and so on.

If, in the same example, the random bit selector 20 (RB) is set to take a stream of 3 bits (M=3) and the PLRB row takes the addresses 3, 5, 1, respectively, (thus for example for random bit number 1 (rb#=1), its $plrb_1$=3 and the content selected for that bit is 0) then the content to be selected from the datastream 10 comprises the contents of addresses 3, 5, and 1, giving a row RB Content of: 0,1,1.

In the above example, 3 bits are selected from a bitstream of 8. In practice much larger numbers of bits are preferable. Thus, given a long stream of bits, SB, comprising highly mixed zeros and ones, then the quantities of zeros and ones may be expected to be approximately equal—although preferably not exactly 50%:50%—but mixed Preferably, the quantity of random bits to be picked out of the stream bits should be much less than the total number of bits in the bitstream, i.e. M<<N. and the PLRB addresses are preferably independently choosen or produced, such that as an outcome two independent sources provide an overall result which we may practically regard as truly random, that is to say the digital equivalent of tossing a fair coin M times.

It is noted that, additionally, if the PLRB addresses are independently random, and the bitstream is a random bitstream too, then the result is pure randomness even on a theoretically ground.

In FIG. 2 the selection process is illustrated by broken arrows 22 linking the address positions in the random selector 20 to address positions in the bitstream 10, and solid lines illustrating corresponding random bits being transferred from the bitstream 10 to the random selector 20.

In a preferred embodiment, addresses in the PLRB are allowed to repeat themselves. In an alternative embodiment repetition may not be allowed. FIG. 2 illustrates an embodiment in which repetition is permitted and in both rb#=1 and rb#=M, the bit selector selects the same bit positions such that a'plrb'=4 is shown.

In the process described above, in which we select M bits with repetition out of N bits, each bit having a value of either zero or one, the M random bits themselves give $2^M$ possibilities for the random datastream. However, given that they are selected from the abovementioned N bit datastream, there are $N^M$ possibilities for guessing the M ordered positions of the random bits in the N bits datastream, so that as N>2 then $N^M$>>$2^M$ . . Thus, use of the above described selection process on a long and mixed stream makes it considerably harder to guess the PLRB, and thus the random datastream, than it is to guess the content of a pure random stream of M bits.

Reference is now made to FIG. 3, which is a simplified diagram illustrating two consecutive random processes of the kind shown in FIG. 2.

The two consecutive random processes illustrated in FIG. 3 are labelled $RndPro_i$, and $RndPro_{i+1}$ respectively. In practice, a large number of such processes $RndPro_1$, $RndPro_2$, $RndPro_3$, $RndPro_4 \ldots RndPro_P$ are carried out sequentially as part of a user operation based on random data, each process differing both in the datastream 10 on which it operates and in the address series which it uses to select and construct the random datastream.

Preferably, both of the above-referred inputs, the datastream 10 and the address stream PLRB, are not only different each time, but preferably issue from independent sources.

Figure 4:
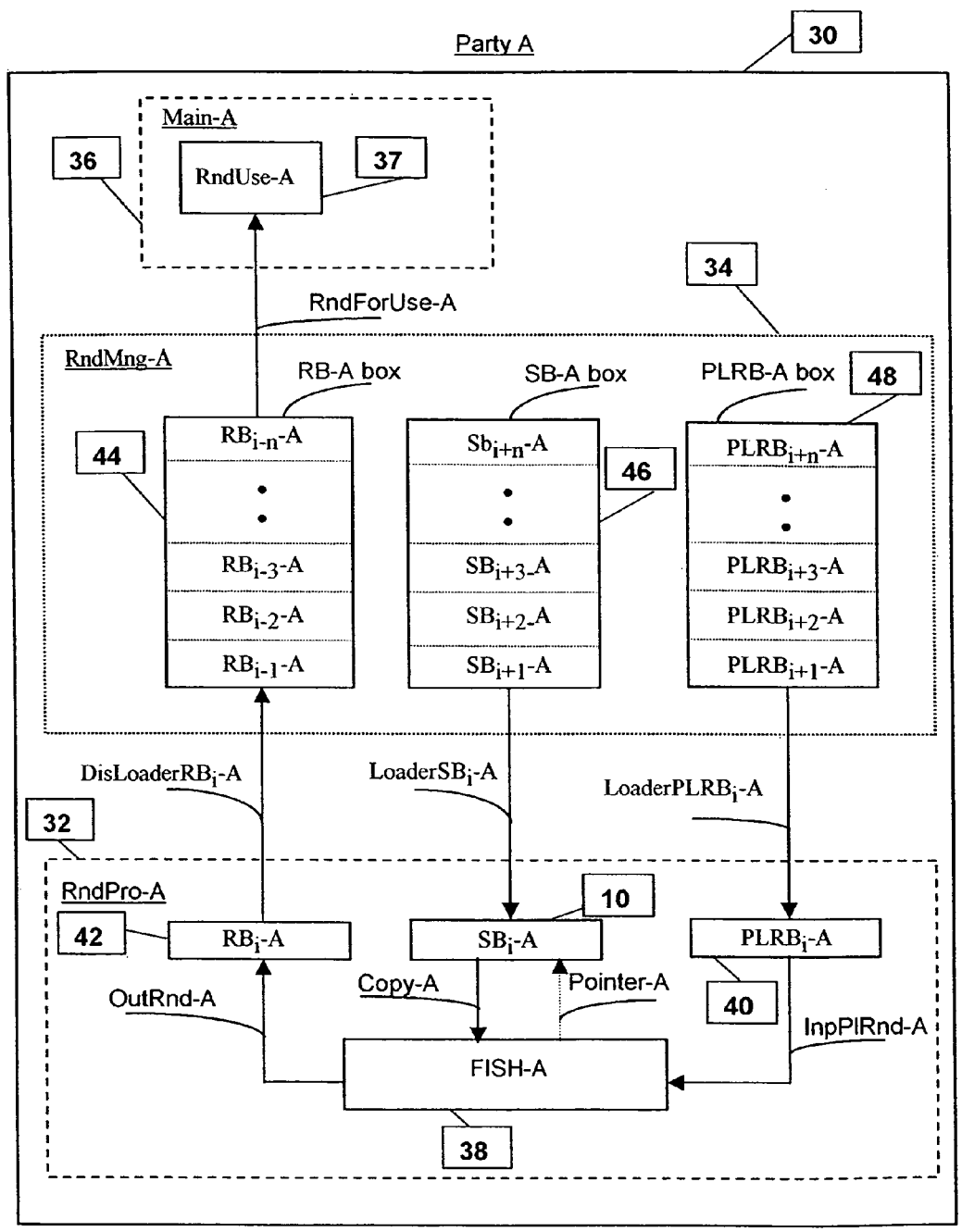
FIG. 4 is a simplified block diagram illustrating apparatus located with a given party for obtaining random data of the kind described above.

Reference is now made to FIG. 4, which is a simplified block diagram illustrating apparatus located with a given party for obtaining random data of the kind described above.

In FIG. 4, a party A is provided with apparatus 30 for obtaining in sequential, consecutive, and/or in a serial manner random datastreams from datastreams 10 (SB) as described with respect to the foregoing figures, and using it to provide randomness. The apparatus of FIG. 4 comprises apparatus 32 as the random process, a random manager 34, which manages the obtaining and subsequent distribution of random data, and a random data user 36, which may be any kind of hardware or software module and which requires random data for one or more processes 37 carried out therein.

The random data process 32 comprises the datastream 10 which is simply a succession of bits, which are highly mixed of ones and zeroes- , as described above. A data selection device 38 selects data from the datastream 10 in accordance with an address supplied to it as a pointer by an address register 40. Data located using the pointer is transferred to a random data register 42 from which it is preferably transferred to the random manager 34, into an RB shift register 44. The RB shift register preferably contains data from succeeding random data selection steps and the data therein is supplied to the random data user 36. The random data user 36 is any process that requires random data as one or more of its inputs. As illustrated, each cell in the shift register 44 contains the M bits of an entire process of the kind shown in FIG. 2.

The random manager 34 further comprises a second shift register 46 for storing successive data items of the datastream 10 for successive introduction into the random process 32. The random manager 34 also comprises a third shift register 48 for storing successive selected addresses to transfer to register 40 for providing selection locations for obtaining 'random' data from the data stream 10.

Typically the random data that is transferred to the random data user 36 is required to be duplicated at one or more remote sites, as will be discussed in more detail below, so that a process being carried out by the random data user 36 may be duplicated at the one or more remote sites.

It will be appreciated that FIG. 4 illustrates just one possibility out of many for random data selection to execute random data selection at a given party. The embodiment of FIG. 4 may be implemented in computerized format in hardware and/or in software as desired.

As shown in FIG. 4, an electronic or computerized embodiment of the random process shown in FIGS. 2 and 3, may provide a random output in a sequential, consecutive, and/or serial manner.

Figure 5:
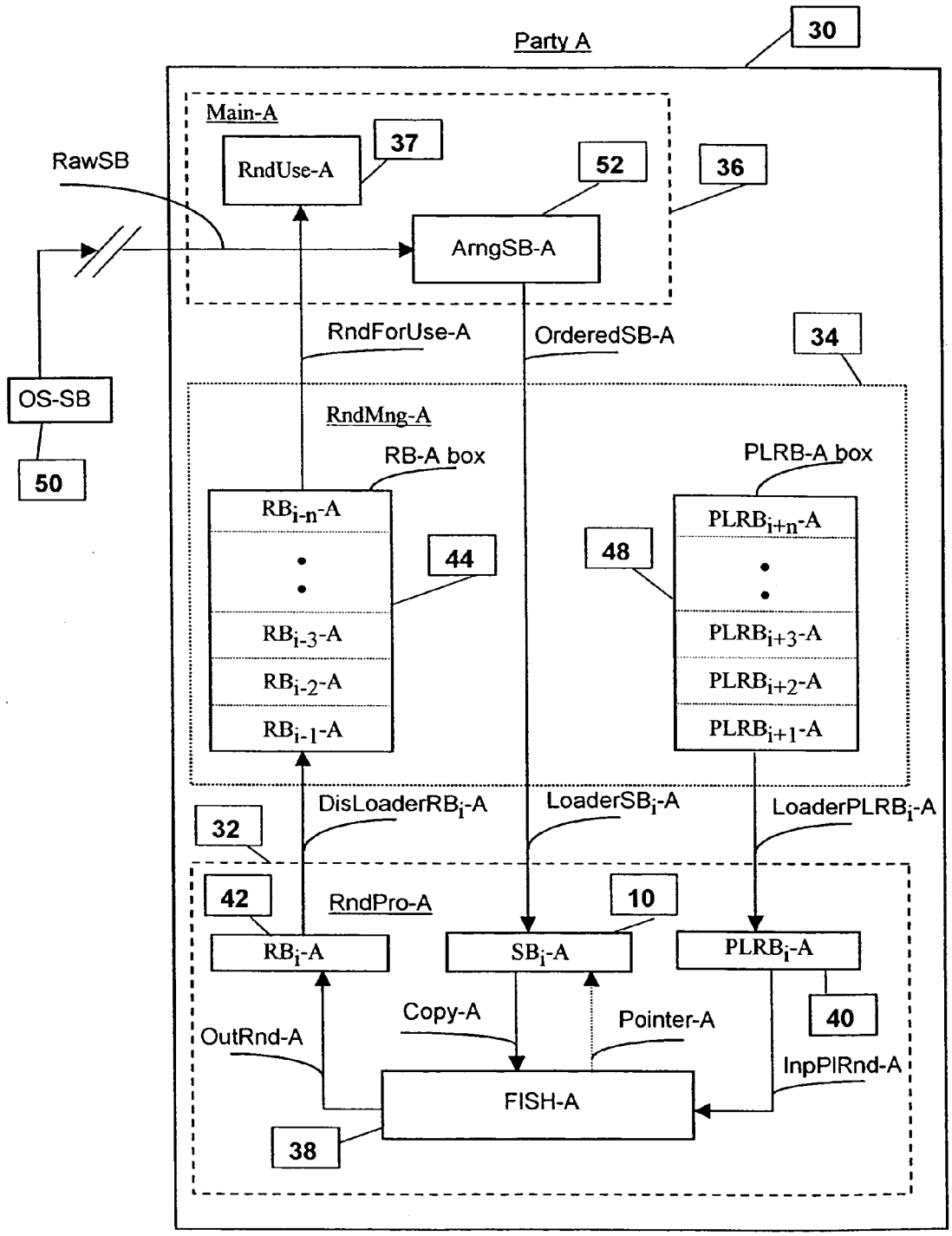
FIG. 5, is a further preferred embodiment of the present invention.

Reference is now made to FIG. 5, which is a further preferred embodiment of the present invention. Parts that are identical to those shown above are given the same reference numerals and are not referred to again except as necessary for an understanding of the present embodiment. The embodiment of FIG. 5 differs from that of FIG. 4 in that the random manager 34 does not have the second shift register 46 in which succeeding streams of N data bits of the datastream 10 are held. In its place, an external source of highly shuffled bits 50 is gathered and made use of in real time. Input from data source 50 is indicated as Raw SB, meaning raw stream bits.

Input from data source 50 is collected in a stream bit arranger 52 (ArngSB-A), to be arranged into a series of ordered N-bit streams, for supply to the SBi-A register 10 to be used as described in respect of the previous figures.

Thus, the processes described above may rely on any source of highly shuffled data including external sources, and do not require any initial arrangement of the data in order to use the data in real time operation.

Figure 6:
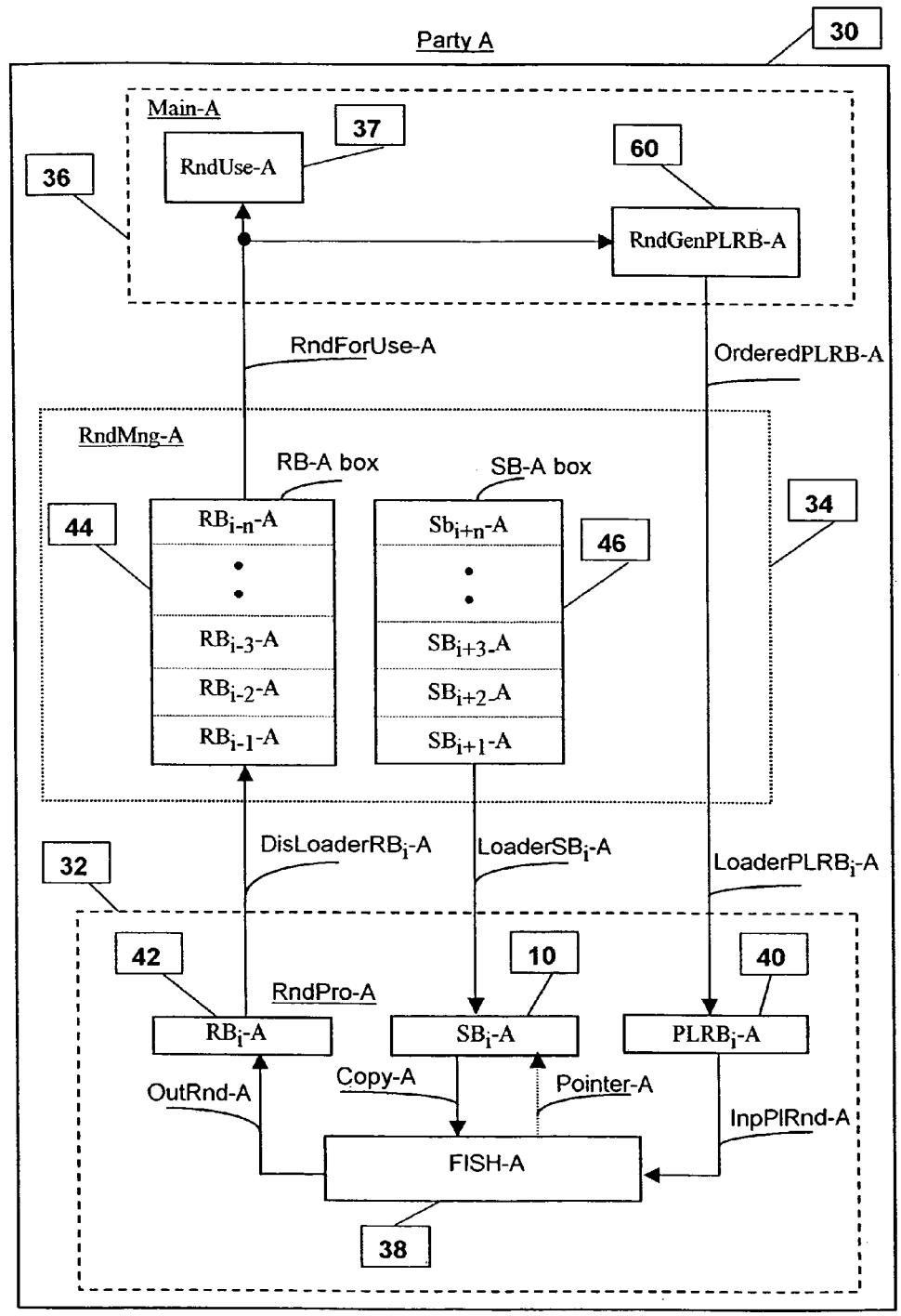
FIG. 6, shows a further embodiment of the present invention.

Reference is now made to FIG. 6, which shows a further embodiment of the present invention. Parts that are identical to those shown above are given the same reference numerals and are not referred to again except as necessary for an understanding of the present embodiment. FIG. 6 is identical to FIG. 4 except that the third shift register 48 is omitted from the random manager 34 and, in its place, addressing information is output directly from an address generator 60. The address generator 60 preferably uses the output of the first shift register 44 as an input, and thus a single random input may be used both to provide the random data used in processes 37 and to provide the random address generation for picking randomly stream of M bits from the datastream 10. It is noted that independent generation of the addresses relative to datastream 10 yields an overall result which we may practically regard as truly random, that is to say the digital equivalent of tossing a fair coin M times. In the present example, additionally the PLRB addresses are produced randomly.

In FIG. 6, the address generator 60 may comprise any generation algorithm which is able to produce from an input of M random bits, or multiples thereof, an output of M selected random places or pointers in the range 1 to N. As illustrated, the output is loaded into address register 40 (PLRBi-A) for use as pointers to data in the bitstream 10 as before.

Thus, FIG. 6 illustrates the ability to perform the aforementioned random processes without requiring the third shift register 48 and preferably also, without needing an external source to generate the addresses.

Figure 7:
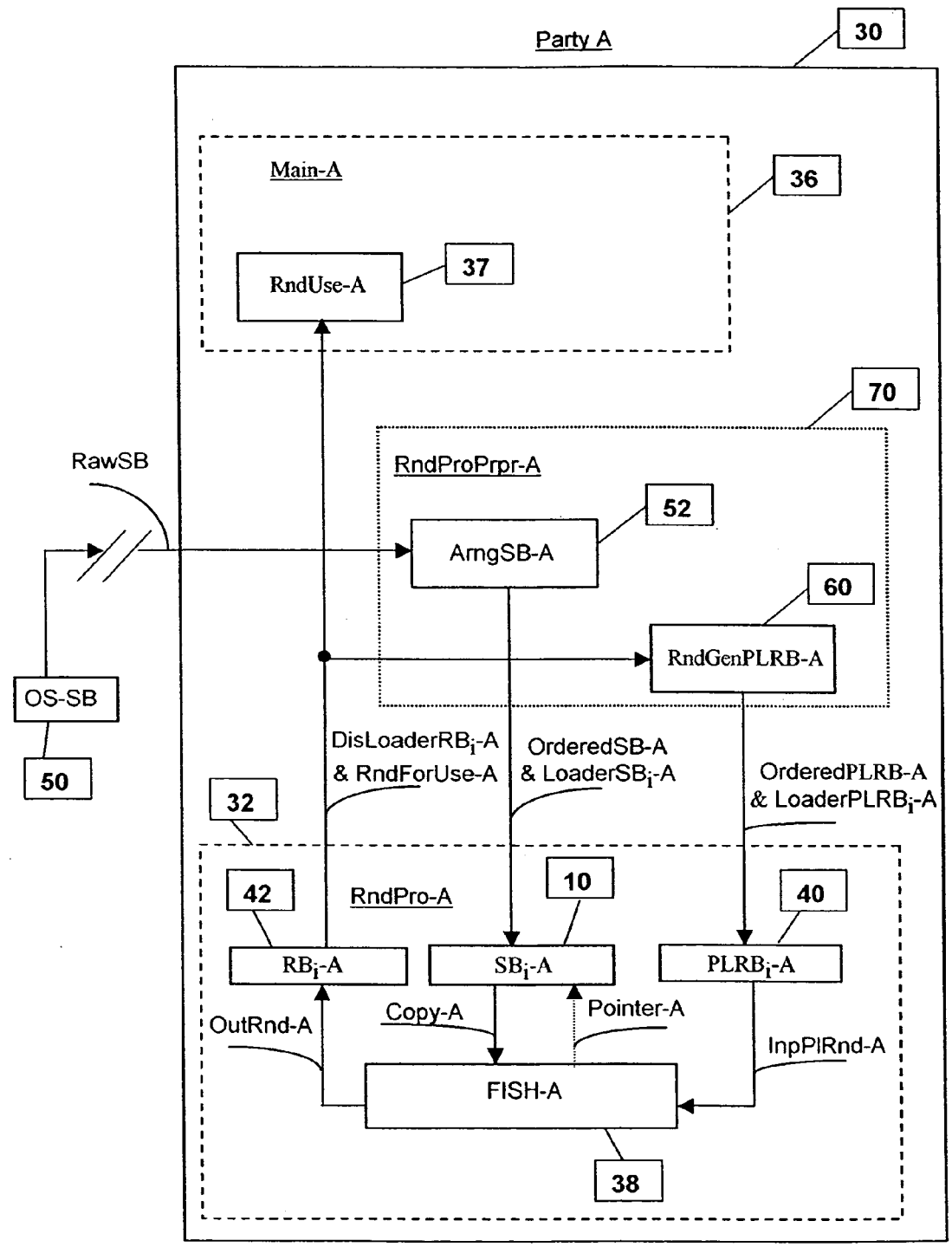
FIG. 7 is a generalized block diagram illustrating a further embodiment of the present invention.

Reference is now made to FIG. 7, which is a generalized block diagram illustrating a further embodiment of the present invention. Parts that are identical to those shown above are given the same reference numerals and are not referred to again except as necessary for an understanding of the present embodiment. The embodiment of FIG. 7 is identical to that of FIG. 4 except that the random manager 34 is replaced by a random process input preparation unit 70. The random process input preparation unit 70 (RndProPrpr) preferably comprises the stream bits arranger 52 and the address generator 60 so that raw data from external source 50 may be arranged and used directly through arranger 52, and the randomized output of the random process 32 may also be used directly to produce addressing data through the address generator 60. Thus the first shift register 44 is also preferably dispensed with.

FIG. 7 thus illustrates a combination of the ideas illustrated in FIG. 5 and FIG. 6 with the additional concept of consecutive sets of M random bits being used in real time as required. As all the data is now being used in real time, all of the shift registers are now dispensed with and thus the random manager 34 is no longer required.

Thus, FIG. 7 illustrates an ability to perform the aforementioned random processes, in real time and/or on demand and preferably without requiring shift registers for storing whole stages of random bits.

Figure 8:
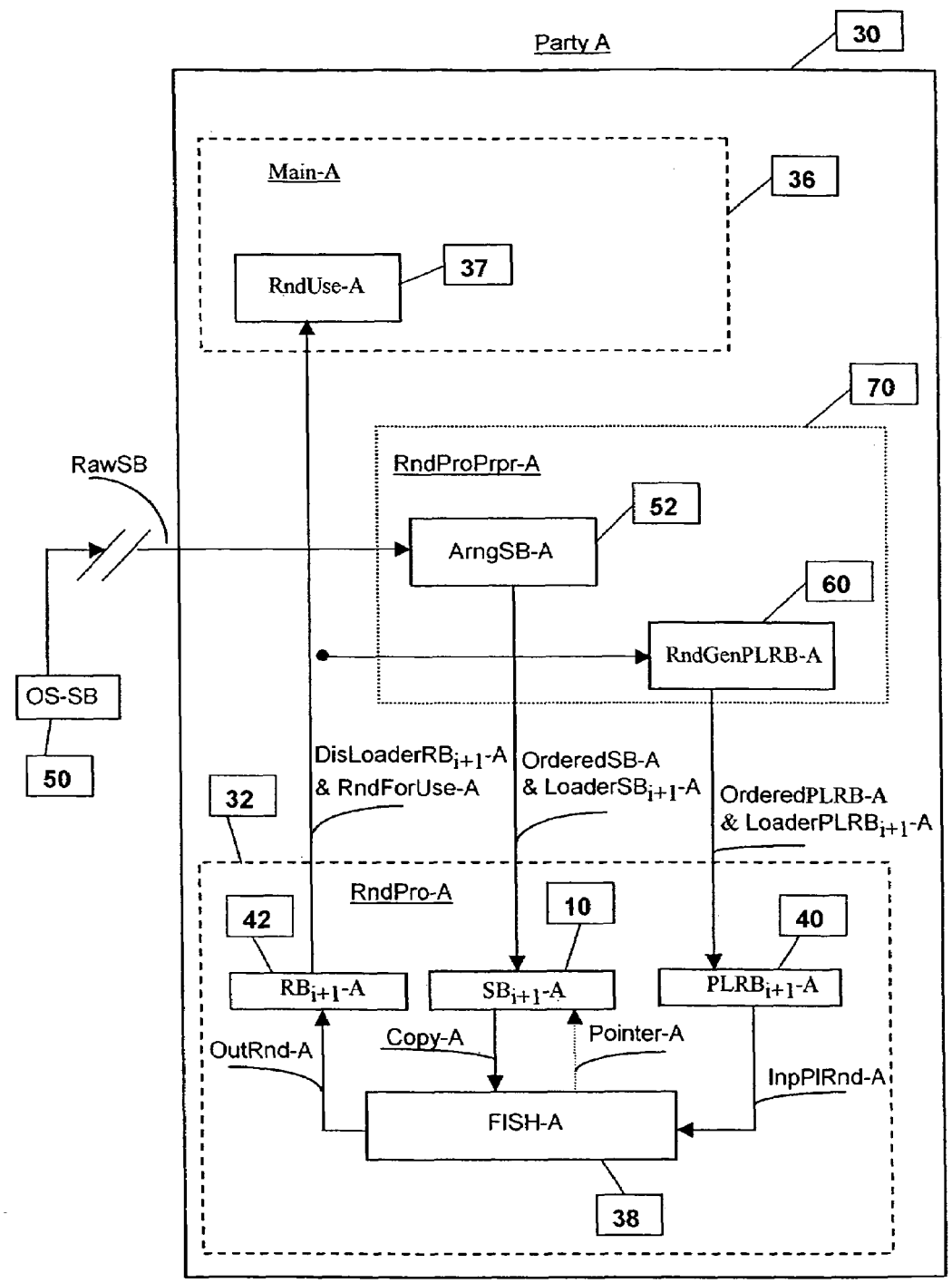

Reference is now made to FIG. 8, which is the same in structure as FIG. 7 but whereas FIG. 7 illustrates random process i, FIG. 8 illustrates random process i+1, thus illustrating the consecutive manner of the preferred embodiments. Parts that are identical to those shown above are given the same reference numerals and are not referred to again except as necessary for an understanding of the present embodiment. However the index of the operation is i+1, in place of i in FIG. 7.

Figure 9:
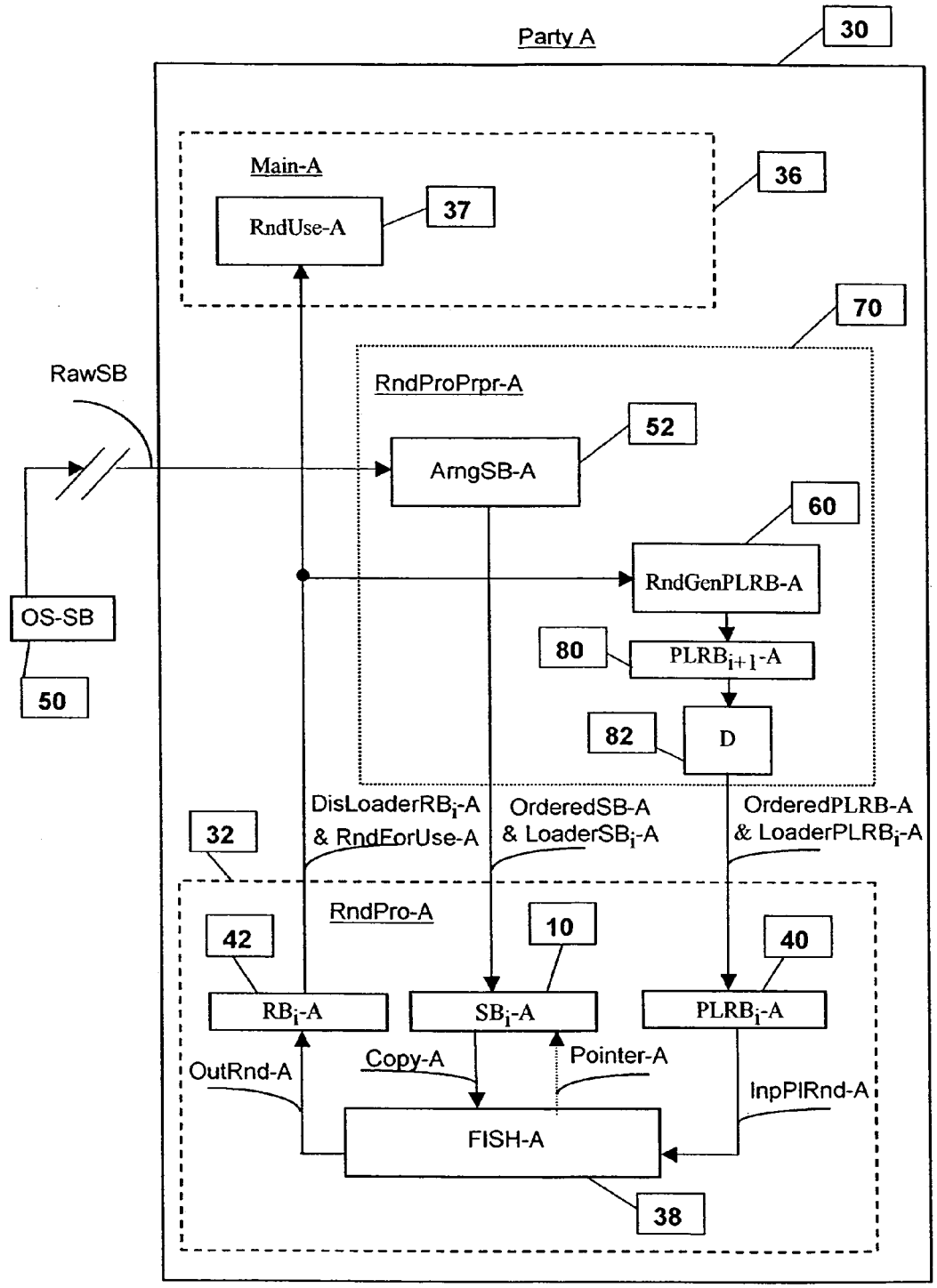
FIG. 9 is a generalized block diagram of apparatus in accordance with a further preferred embodiment of the present invention.

Reference is now made to FIG. 9 which is a generalized block diagram of apparatus in accordance with a further preferred embodiment of the present invention. Parts that are identical to those shown above are given the same reference numerals and are not referred to again except as necessary for an understanding of the present embodiment. FIG. 9 is identical to FIGS. 7 and 8 except that the output of the address generator 60 is not fed directly to the address register 40 but rather an entire block of selected addresses is stored in a further register 80 and then buffered using a delay buffer 82.

The result of using a delay buffer is that, whilst random data being output is part of a process i, the data that is being used for the addressing in process i, comes from the random output of process i−1.

Figure 10:
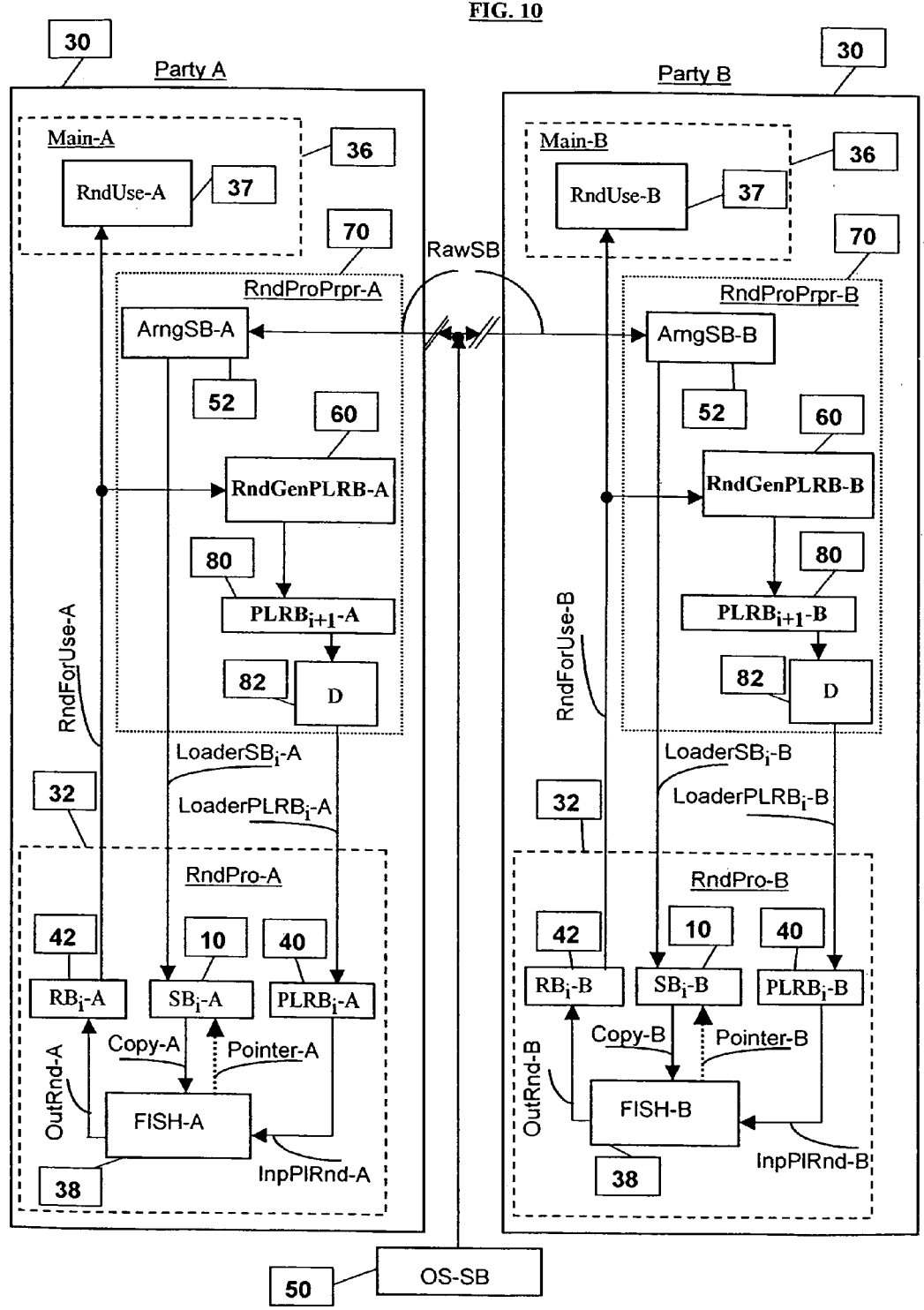
FIG. 10, is a generalized block diagram showing how the embodiment of FIG. 9 may be used to obtain identical random data at two or more remote locations.

Reference is now made to FIG. 10, which is a generalized block diagram showing how the embodiment of FIG. 9 may be used to obtain identical random data at two or more remote locations. Parts that are identical to those shown above are given the same reference numerals and are not referred to again except as necessary for an understanding of the present embodiment. In the embodiment of FIG. 10, two parties, party A and party B have identically set apparatus 30 and obtain a stream of raw data from an identical data source 50. In addition, stream bit arrangers 52 comprise identical settings at each of the parties. It will thus be appreciated that an identical random datastream is supplied to each of the random data user processes 37.

Figure 11:
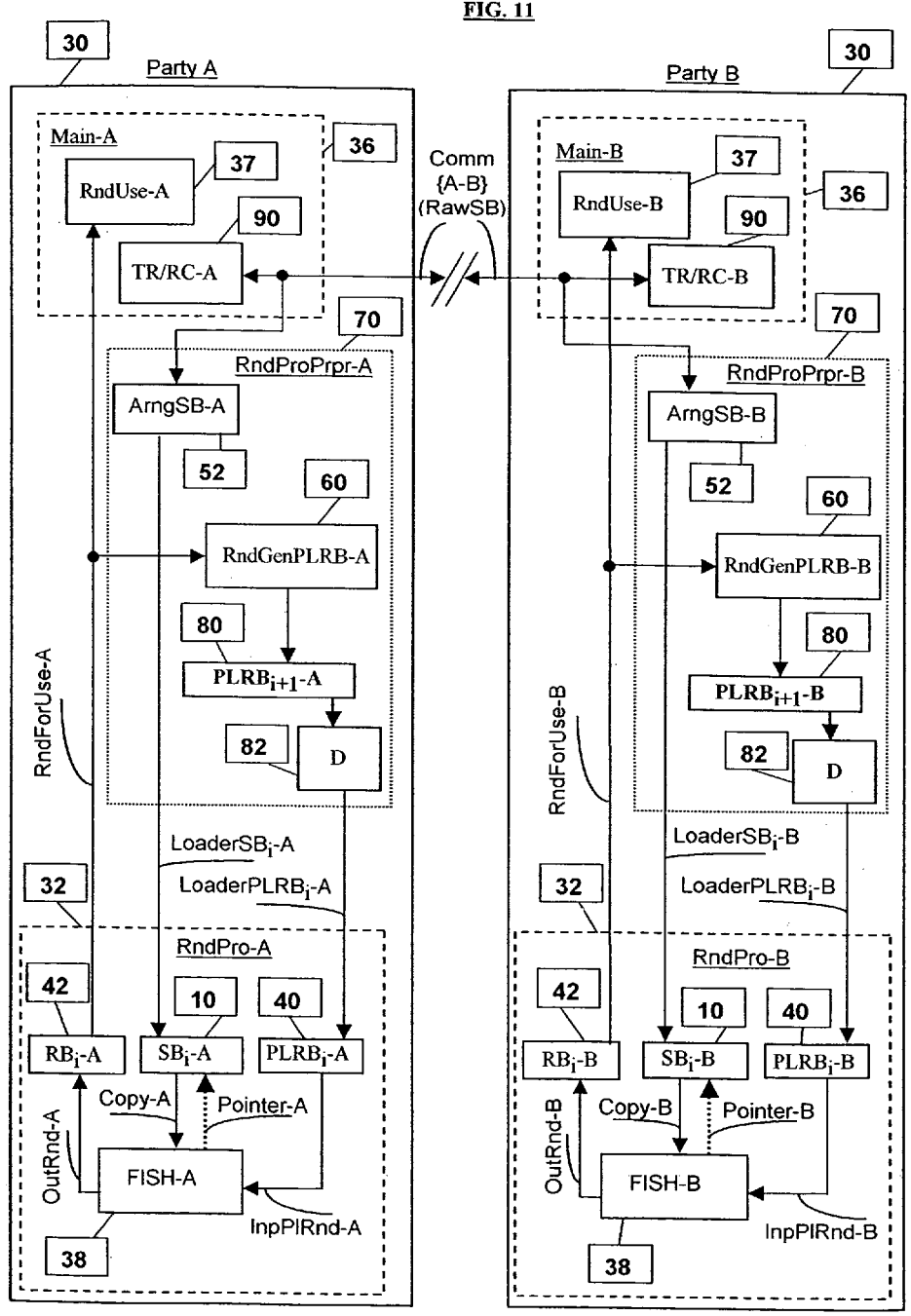
FIG. 11, is a generalized block diagram illustrating a further preferred embodiment of the present invention.

Reference is now made to FIG. 11, which is a generalized block diagram illustrating a further preferred embodiment of the present invention. Parts that are identical to those shown above are given the same reference numerals and are not referred to again except as necessary for an understanding of the present embodiment. In the embodiment of FIG. 11, an external stream of raw bits is dispensed with and instead a stream of raw bits based of the communication between the parties is used. Such a bit stream may be produced independently and specifically for that purpose, or may be part of the general, normal communication (which is independent of the random data production ) between the parties, that is produced at one of the parties and transmitted to the other via a transceiver 90 (TR/RC) as shown in the figure. In any case the identical bit stream is available at each of the parties.

Figure 12:
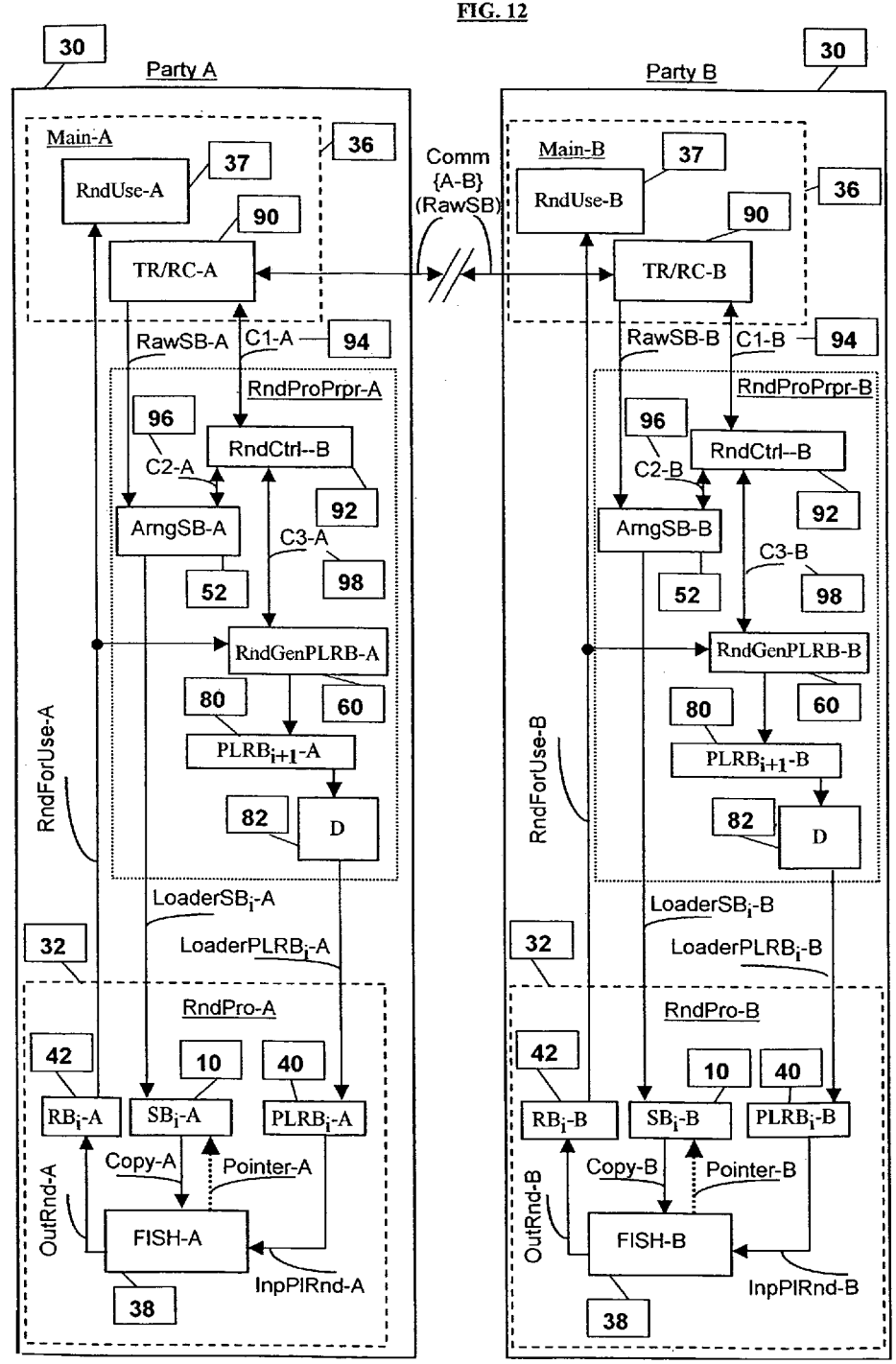
FIG. 12 is a generalized block diagram showing a further preferred embodiment of the present invention.

Reference is now made to FIG. 12 which shows a further preferred embodiment of the present invention. Parts that are identical to those shown above are given the same reference numerals and are not referred to again except as necessary for an understanding of the present embodiment. FIG. 12 is the same as FIG. 11 except for the addition of a monitor and control unit 92, at each of the parties, for controlling the entire random process including all its component parts. The monitor and control unit 92 is connected to the transceiver 90 via a first monitor/control line 94, to the stream bit arranger 52 via a second monitor/control line 96 and to the address generator 60 via a third monitor/control line 98.

The randomness monitor and control units 92 are preferably responsible for the monitoring and control of the random processes at each party, such as to enable the processes to operate correctly and simultaneously at both parties.

The randomness monitor and control units 92 are preferably responsible for the ensuring synchronization of operation at both parties of the randomness mechanism for the entire required duration, such that for the entire duration the respective parties have access to the same sequence of random bits at the same time First monitor/control lines 94 at each respective party, which connect the monitor/control units 92 to the transceivers 90 respectively, allow for monitoring of received communicated data for control bits, check bits and the like and modification of the communicated data to be transmitted for the insertion of control bits, check bits and the like.

Thus the parties are able to use the first monitor/control lines 94 to signal to each other concerning a random process to be initialized, the parties are then able to add control bits into the communication datastream, and may thereby obtain indications of whether or not they are synchronized in regard to the random processes, and thus whether or not they are both using the same random data.

Using the first monitor/control lines 94, the parties are also able to exchange handshakes, error correction/detection codes (CRC etc.) outputs of one way functions (e.g. hash functions of the random bits), etc., as additions to the communication data stream.

The second monitor/control lines 96 connect the monitor control unit 92 to stream bit arranger 52. In a preferred embodiment monitor/control lines 96 are operable to control the operation of stream bit arranger 52 to ensure correct timing of its operation.

The third monitor/control lines 98 connect the monitor control unit 92 to the address generators 60 of the parties respectively, and preferably to serve to ensure correct timing of operation of the address generators 60 and of subsequently connected units such as the data selection device 38. As well as correct timing it may serve to control other aspects of synchronous operation such as to ensure that the address generators are similarly set.

Thus, by means of the above control ability, the parties are able to maintain synchronization between each other up to a certain level of tolerance, for errors such as normal communication bit errors. Error detection and correction codes are generally able to correct normal, that is low level, errors, and for gross errors are at least able to provide an immediate indication of their occurrence. Such an occurrence may indicate loss of synchronization.

As well as gross bit errors, other causes of loss of synchronization may result from loss of contact between the parties, or a miscalculation between the parties or like problems which the skilled person will be able to consider. The use of control signals allows the parties to receive a picture of what is happening at the other party and thus to become aware at an early stage that synchronization has been lost.

Once synchronization has been lost, it is now up to the parties to regain synchronization. However, the parties are now presumably out of step with each other and at least the most recent step is not present, at least not in full, at one of the parties. Since, in the preferred embodiments, the selection of bits from the raw datastream in the present step depends on the random data produced during the most recent step, the absence of one step or part thereof makes resynchronization impossible. Furthermore, any attempt by one party to supply the other with the missing information raises all of the problems of the Byzantine agreement problem referred to above, as does any attempt to resynchronize by initiating a new communication from scratch.

Thus, at the point at which it is desired to resynchronize, one party may be at step i+1 or even i+2, or further, while the other party is still behind—say at i—and is thus unable to activate a simultaneous, synchronized random process even though the raw stream bits are now being received correctly.

As will be explained in detail below, in order to handle resynchronization in such circumstances of loss of synchronization, a further preferred embodiment considers three different aspects of such an event, and gives solutions thereto, as follows:

1. The recognition of an occurrence of synchronization loss-detection.
2. The prevention of synchronization loss due to minor (meaning correctable) errors,—prevention.
3. The handling of unpreventable synchronization loss, in particular including re-synchronization of the parties in such a manner as to overcome the limitations of the Byzantine agreement problem—secure resynchronization.

Detection is carried out, as described above, by the exchange between the parties of error checking or control codes. It will be clear to the skilled person that the data exchanged between the parties should not be sufficient to enable reconstruction of the data by an unauthorized party.

As described above, control data is preferably exchanged between the parties, (which data may be transferred openly or confidentially depending on the circumstances), and preferably contains indication bits being one or more of the following:

CRC check bits or bits defined using other, redundancy based, error detection codes, and A result of a one way function of the random bits, for example a one way hash function of the random bits, is that the other party may easily detect loss of synchronization by simultaneously inputting his own data to the same hash function and compare his result with the received result. A particular advantage of using a one-way function for this purpose is that the control data actually sent does not allow an eavesdropper to be able to reconstruct the random data stream.

Issue number 2—the prevention of synchronization loss due to minor errors, for example low levels of channel bit errors. Such synchronization loss prevention is carried out by using the error correction ability of any redundancy based codes to repair minor errors in the data stream received from the channel. Preferably, the error protection is applied only to the random bits collected from the datastream in the process, thus the overhead is minimized. Alternatively, a stronger error correction code may be used, again protecting only those random bits, but against higher error rates. Any case, such a correction mechanism has limits on the maximum number of bit errors it is able to correct. In a preferred embodiment, the level of error correction is set for each communication in accordance with gathered statistics of the channel conditions at the start of communication. In a further preferred embodiment, the level of error correction is corrected according to channel statistics gathered dynamically over the duration of the communication. Nevertheless, there may be occurrences in which more errors occur than can be corrected for, in which case synchronization loss is liable to occur, or because of some other cause, such as communication cuts, etc.

Thus, according to the embodiment already discussed, the parties can a.) recognize if they are out of synchronization, and b.) can avoid loss of synchronization as a result of the majority of error events.

A small minority of error events, however, are liable to lead to synchronization loss, as are other events such as cuts in communication, etc.

A preferred embodiment thus provides a re-synchronizing mechanism which consists of basing resynchronization on random data of previous stage(s) which both parties have successfully carried out. Thus, they are both able to use random data that they know the other party has an identical version of and knows it is supposed to be used in the generation of a backup address selection which may be used to provide a resynchronization address selection from the raw data stream when resynchronization is activated. In this case, previous random data which both parties have successfully gathered is used simultaneously by an agreed mechanism during a backup stage so that at all times the two parties have an agreed backup dataset to use should synchronization loss now occur.

Figure 13:
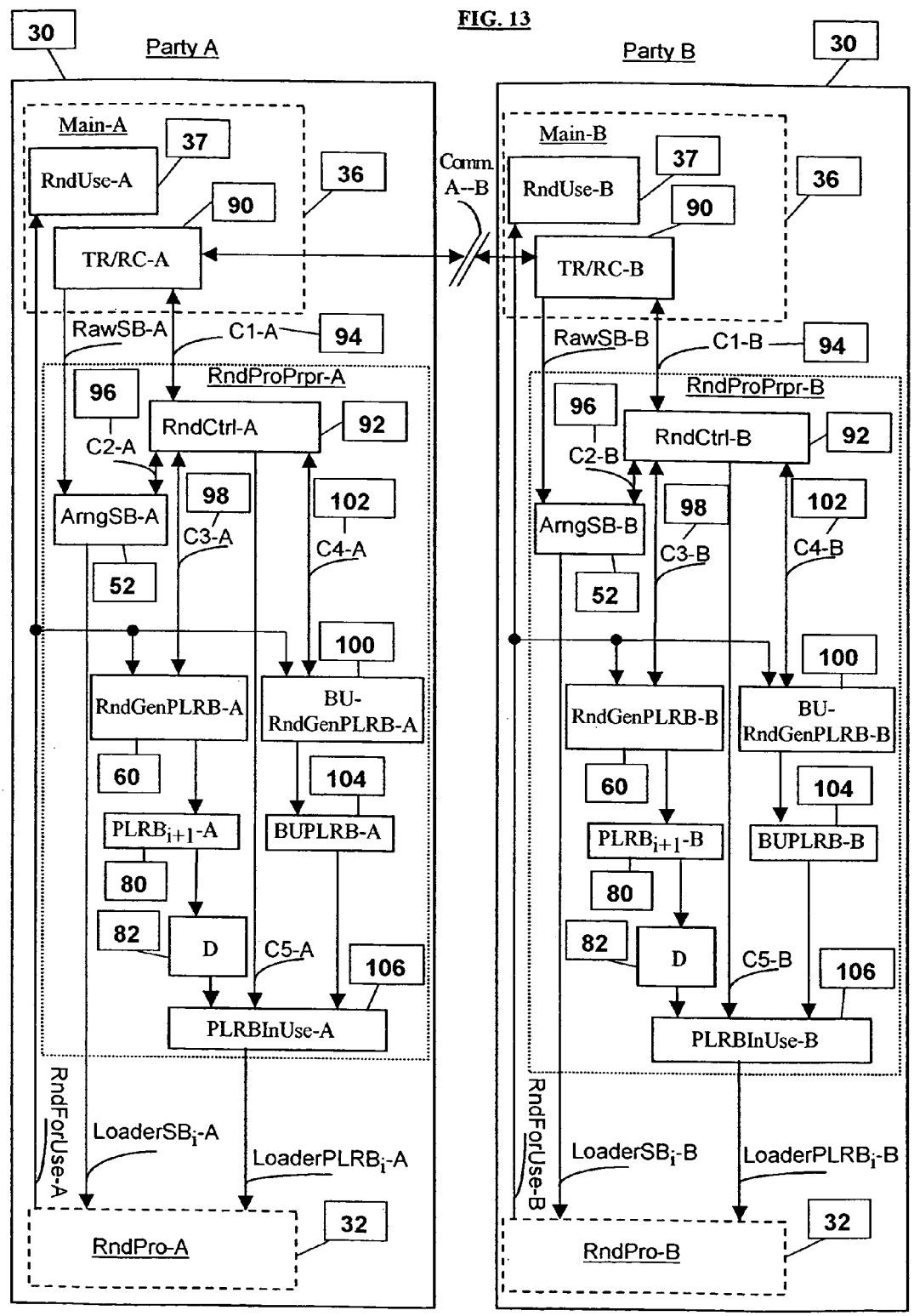
FIG. 13, is a simplified block diagram showing a further preferred embodiment of the present invention, adapted to regain synchronization in the event of synchronization loss between the parties.

Reference is now made to FIG. 13, which illustrates a further preferred embodiment of the present invention, adapted to regain synchronization in the manner outlined above. Parts that are identical to those shown above are given the same reference numerals and are not referred to again except as necessary for an understanding of the present embodiment. The embodiment of FIG. 13 is the same as FIG. 12 except that it includes further functionality for providing a backup address selection in the event of synchronization loss. In the embodiment of FIG. 13, a backup address generator 100 is connected to the randomness controller 92 via a monitor/control line 102. The backup address generator 100 is also connected to receive the random data output of the random process 32 and is connected to send an output to a backup address register 104_(BUPLRB). An in-use address register 106, under the control of the randomness controller 92, is connected to the output of the delay unit 82 and to the output of the backup address register 104 to receive either a regular or a backup address for sending to the random process 32, depending on the state (regular or backup) at the time.

Thus, the parties are able to determine that synchronization loss has occurred, upon which the devices 30 enter a backup state. In this backup state previously gathered random data residing kept in the backup address generator 100 is activated to produce backup addresses ready for a backup random process activation. The addresses from the backup address generator 100 are then passed to the backup random address register and from there to the in use random address register 106 from which it is passed on to the random process 32 for random selection of bits from the datastream. Preferably, the datastream from which the selection of M out of N bits is made is a current series of data. However, as described above, the address selection is based on old random data, that is to say previously gathered and already used random data.

By contrast, in the normal state, both parties use the regular address generator 60 to generate random addresses using the current output of the random process 32. The output is delayed by one phase and sent to the in use random address register from which it is sent to the random process 32 for address selection.

As the skilled person will be aware, if the same data is always used as the backup data then activity upon loss of synchronization will be repeated, leading to loss of security. An eavesdropper may for example, follow several resynchronization cycles and eventually be able to synchronize himself to the parties. Thus, in a preferred embodiment of the present invention, the backup random data used for production of backup addresses, is regularly changed in a confidential and secure manner.

In general, it may be assumed that loss of synchronization is not entirely random but occurs with a certain probability level which may be calculated for given channel statistics and level of error correction. The level of error correction is preferably selected such that synchronization loss is relatively rare and at the very least does not occur at each stage of the random process, but rather only once in a while, with most of the stages of the random process being successful and synchronization being maintained.

Thus, a preferred embodiment comprises changing the backup random data at a lower frequency than that of the regular random data. The regular random data is preferably changed at each stage of the process as described with respect to FIG. 2, that is to say each selection of M bits out of N is a stage and each stage is preferably carried out using different data to select the random addresses. In other preferred embodiments the regular random addressing data may be changed less frequently. Either way, the back up random addressing data is changed only once for several changes of the regular data. Preferably the ratio of regular to backup changes is a relatively high ratio. The change of back-up data is preferably carried out 'silently' in the background, to be ready for use in the rare case of need.

The back up random data generally provides the only way to regain synchronization, and is preferably changed once in a cycle of a plurality of regular stages. The following embodiment provides a means of synchronization using the backup data as described above, which means overcomes the problems of the Byzantine agreement problem.

In the following embodiment, groups of regular stages are grouped into a unit referred to hereinbelow as a session. A session may comprise one or more stages and has a beginning and an end, preferably defined by control handshakes between the parties to start a session and/or control acknowledgements between the parties at the end of a session. A predetermined number of regular sessions as referred to above is defined as a Round, and the backup random data is changed once per round, provided that the round contains only successful sessions, meaning that synchronization was maintained throughout. In practice, a session is preferably defined in accordance with the user needs in process 37, as discussed in detail above.

A good session is defined as a session, over the duration of which the parties remain in synchronization (to the best of their knowledge. In the following, a round comprises L good sessions and a session comprises 1 or more stages.

At the end of a given round, the back up random data for use as the 'meat' to produce the back up address data is exchanged with back up random data obtained during the first K stages of the round. K may be 1 or more but should be small with respect to the number of stages in the round so that the data is obtained only during the early part of the round.

Thus, as the sessions are of one or more stages the backup random data is gathered in the first session or first few sessions of a round.

As soon as synchronization loss is recognized at any party, that party ceases to count sessions towards the completion of the round and "freezes" at its current position within the current session count.

Once it is agreed between the parties that synchronization has been lost, a backup session is entered. The backup session is as described above in respect of FIG. 13, in that previously stored data is used to provide the random addressing information to select M bits from a datastream of N bits. Following a single backup session, the users are able to return to a synchronized state and may immediately begin a new round. That is to say, a first good session after a backup session is counted as the first session in a new round.

Figure 14:
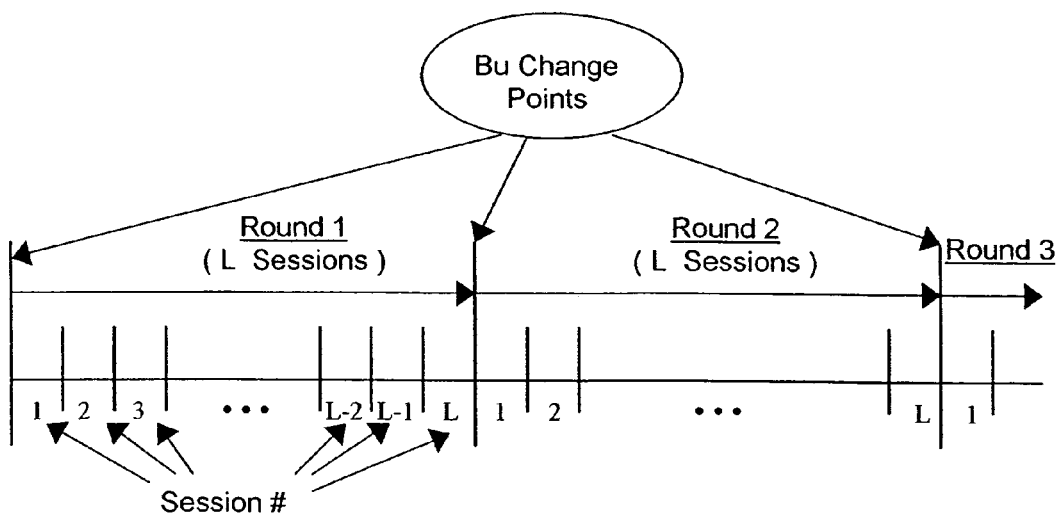
FIG. 14 is a simplified diagram showing a preferred structure of a process between two parties useful for the resynchronization embodiment of FIG. 13.

Reference is now made to FIG. 14, which illustrates the session and round structure of the random processes. In FIG. 14 there are shown three rounds of good sessions, (round 1, round 2, round 3). At the end of each round is a backup changeover point (Bu change point) at which the parties change the back up random address data. Each round comprises L sessions and each session comprises one or more stages as discussed above.

As mentioned above, the backup random address data preferably consists of randomness gathered and saved at the first few stages of the first (few) session(s) of a round, and which randomness has already been used in regular and successful session(s) prior to the point of changeover, where it may now provide the new backup data. The fact that the data has already been used in regular and successful sessions preferably ensures that the information is identical at both parties. If it were not identical it should already have led to loss of synchronization.

It is noted that although, in the event of a backup session, random data already used in regular sessions is used again, the random data is preferably used via a different address generator (100 in place of 60 in FIG. 13) and secondly the random data for generating a backup address is preferably based on more then one regular stages and thus preferably bears no discernible relation useful for assisting an eavesdropper.

Thus resynchronization is carried out reliably in such a way that the users may rest assured that the resynchronization is carried out with the same party that synchronization was lost with immediately before. However, there still remains the question of how to overcome the session lag between the two remote parties. How does each party know that the other party has not just crossed a changeover point and thus exchanged backup random data, thus making resynchronization impossible because each party is now using different backup data, the first party not having passed the changeover point?

Figure 15:
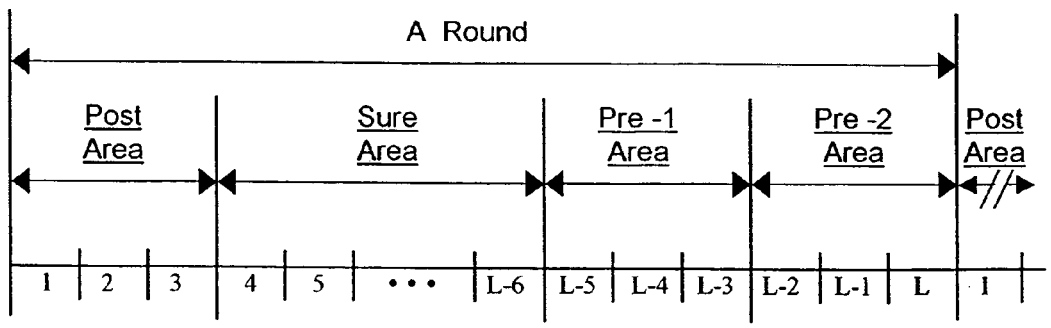
FIG. 15 is a more detailed structure of a process between two parties allowing resynchronization even in the event of the parties being in a different backup state.

Reference is now made to FIG. 15, which shows additional structure of the rounds and sessions shown in FIG. 14, operable in accordance with a further embodiment of the present invention. In accordance with the embodiment of FIG. 14 a round is divided into four areas ordered as follows, a post area, a sure area, a pre-1 area and a pre-2 area. The post area immediately follows a backup changeover point and a pre-2 area immediately precedes a backup changeover point. The random processing between the two parties is carried out using a rule that, at any given time, no two parties may be separated by more than one area. Should synchronization be lost it may be assumed that, as a worst case, a maximum of one further session has occurred at one of the parties, without the knowledge or participation of the other party, and thus a maximum distance of one area may be assumed. In a preferred embodiment, each area consists of at least two sessions thereby to provide safeguards against extremely rare but not probabilistically impossible occurrences. Thus following loss of synchronization it may be assumed as a worst possible case that they are two sessions apart, which again, in a worst possible case may mean one area apart.

Thus there may be defined a gray area around each backup changeover point wherein it cannot be guaranteed that the other party is in the same session. In this gray area it is preferable for parties to be able to share a random process using either of the backup random address data. In one embodiment, parties moving into a new round do not delete the old data until they have passed the gray area. In an alternative embodiment, parties entering the gray area ensure that they are in a position to use the random data of the next round before they actually reach the changeover point. In a third, and preferred embodiment, which will be described in greater detail below, the parties are in fact able to do both.

In FIG. 15, the Sure Area is the area that is relatively far from the last change point, and relatively far before next change point, such that in case of desynchronization, a party being in this area can use the current backup data confident in the belief that the other party is using the same current backup data.

The Pre-2 Area_is the region immediately preceding the backup changeover point. The Pre-1 Area_is part of the gray area and is located between the Sure Area and the Pre-2 Area The gray areas preferably comprise only a small number of sessions, typically two or three. At the changeover point the old backup data is removed as the principle backup data, and replaced by that of the new round but is maintained in readiness since it may still be needed.

In the two pre- areas, the main memory contains the current backup data. However, the new backup data can be constructed as needed should it be required in the same way as it would normally be at the normal backup changeover point.

Reference is now made to FIG. 16, which illustrates how control is exercised during communication between two parties in order to manage resynchronization in each area in the manner described above with respect to FIG. 15.

Each session is marked by a number of control messages being exchanged between the parties so that they are able to determine their mutual standing in terms of the session and their mutual synchronization status.

Preferably, one of the parties is designated as the master in a session and the other is designated as a slave. Generally the party initiating the session (that is, of a random process) is the master. In many processes, initiation will be per session, and thus, preferably, a session begins with a control message that the party that initiates the session sends to the other party (who now becomes the slave for that session).

The master preferably considers the control data it has available, and decides if the parties are in synchronization or not.

If they appear to be in synchronization-a regular session is selected and the current random address data is used. A control signal is sent to the slave indicating a regular session.

If, on the other hand, the master determines that the parties are not in synchronization then a back up session is selected and the back up random address data is used. As before he sends the Slave a control message indicating a Back up session. In such a case, the master preferably adds a further control message indicating whether to use current or next backup data. Preferably, if the master finds itself in the gray area, where there is some doubt about which round (including the gray areas) the parties are in, the master actually indicates which set of backup data the slave(s) are to use. Typically this may be based on which side of the backup changeover point the master is in fact located.

The Slave replies with a return control message either agreeing to the mode (regular or back up) indicated by the master or not agreeing to it. Preferably a slave always agrees to a backup mode whether it has detected synchronization loss or not. However, if the master indicates a regular session and the slave has detected synchronization loss, then the slave is preferably able to force the master into a backup mode.

In more detail, a backup session preferably operates as follows:

The master proceeds as follows, depending on which of the four areas the master is located:

1) Master in the "Sure" area. The slave may be assumed to be in the same round. The master indicates 'current' (Curr) in its control message and the current backup data is used by him in the backup session.
2) Master in the 'pre-1' area. The master indicates 'current' (Curr) in its control message. The master uses its current backup data.
3) Master in the 'pre-2' area. In this case, the master indicates 'next' (Nxt) in its control message and begins a backup session using backup data of the next round gathered at the beginning of that round but not yet being placed in the hard memory'(Next1).
4) If the master is in the 'Post' area it carries out a backup session based on the currently stored backup data, which is now that of the fresh new round. However, it issues a control message of 'next' (Nxt) indicating to the slave that if it has not passed a changeover point then it should use backup data of the next session which the slave too has obtained previously, at the beginning of that round, even though it has not yet been placed 'in hard memory'. If it has just passed a changeover point then it may proceed with the current data 'in hard memory'.

In each of the above four cases the slave may be removed from the area in which the master is located by one area. The slave therefore reacts as follows based on the location of the slave at the time that the backup control signal is received:

1) If the slave is in the 'Sure' area the slave simply ignores the control message and uses currently stored backup data for the backup session.
2) If the slave is in the 'Pre-1' area, then the master may be in any one of the sure, pre-1 and pre-2 areas. Thus, the slave uses backup data as defined by the message sent by the master (Current meaning that data currently 'in hard memory' and Next1 meaning backup data waiting to be inserted into 'hard memory' [ normally at the changeover point]).
3) If the Slave is in the 'Pre-2' area then the master may be in any one of the pre-1, pre-2 and post areas. The slave therefore uses the backup data defined by the control message (as in the 'Pre-1' area).
4) If the Slave is in the 'Post' area, then the master may be in any one of the pre-2 (of the previous round), post and sure areas (of the new round). In any of these cases the master uses the new backup data. Thus the slave ignores the control message received and simply uses the new backup data, currently stored 'in hard memory'.

The above-described procedure is summarized in FIG. 16.

It will be appreciated that the detection of a successful session following the backup procedure shows that resynchronization was successful. Successful resynchronization can be detected by the control signals described above and thus the communicating parties are not left in any doubt as to the success of resynchronization.

As described above, following a backup session, a new regular session is begun which is counted as the first session of a new round. Regular sessions are counted from the new regular session to define full rounds for future backup activity, such that backup data for a next round is gathered from early in the new round and is set as the backup data at the next changeover point.

There is thus provided a system in which practical random processes may be shared between two parties in a practical system that provides for resynchronization in the event of synchronization loss and which system preferably overcomes the limitations of the Byzantine agreement problem.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A system for sharing a random process between at least two separate parties in secret manner based on a publicly available primary digital bitstream, the system comprising
    a public electronic network linking electronic processors of at least two parties for communication over said electronic network, there being at said electronic processors of each party:
    holding units respectively for holding a regularly changing copy of part of said publicly available primary digital bitstream, said publicly available primary digital stream being located externally to the at least two separate parties, on said public electronic network, and regularly changing, said copy being available at respective ones of said separate parties, and
    a selector at each party configured for randomly selecting said regularly changing part of said regularly changing primary digital bitstream in a selection operation, to form a regularly changing random bit source,
    wherein each selector is operable to use said regularly changing random bit source to randomize said selection operation in an identical manner at each separate party, thereby to render said regular changes of said random bit source available at respective ones of said at least two separate parties.

2. A system according to claim 1, wherein said primary digital bitstream is obtainable as a stream of bits from a data exchange process between said two parties.

3. A system according to claim 1, wherein said bits in said primary digital bitstream are separately identifiable by an address, and wherein said selector is operable to select said bits by random selection of addresses.

4. A system according to claim 1, wherein each selector comprises an address generator and each address generator is identically set.

5. A system according to claim 4, wherein each address generator is operable to make use of a random digital bitstream to randomize said addresses generator.

6. A system according to claim 1, further comprising a controller for exchanging control data between said parties to enable each party to determine that each selector is operating synchronously at each party.

7. A system according to claim 6, wherein said control data includes any one of a group comprising:

redundancy check data of at least some of the bits from said random bit source, and a hash encoding result of at least some of the bits from said random bit source.

8. A system according to claim 6, wherein said control data includes any one of a group comprising:

redundancy check data of at least some of said addresses, and a hash encoding result of at least some of said addresses.

9. A system according to claim 6, wherein said selector further comprises a resynchroniser operable to determine from said control data that synchronization has been lost between the parties and to regain synchronization based on a predetermined earlier change of said random bit source.

10. A system according to claim 9, further comprising a backup data exchanger for exchanging said data for regaining synchronization.

11. A system according to claim 9, wherein said resynchronizer further comprises a backup data storage for storing previously exchanged data for regaining synchronization to be used for resynchronization with a party that has not made said exchange.

12. A system according to claim 9, wherein said resynchronizer is operable to create in advance future data to be used for resynchronization for resynchronizing with a party that has made said exchange in advance.

13. A random data generator for sharing a random process between at least two separate parties in secret manner over a public electronic network based on a publicly available primary digital bitstream, the generator being implemented on an electronic processor, the generator comprising:

an input configured for receiving at regular intervals a copy of a current part of said publicly available primary digital bitstream, said publicly available primary digital bit stream being located externally to parties using the generator, over said electronic network, said publically available primary digital bitstream changing regularly, a random selector for selecting random individual bits from said publicly available primary digital bitstream to form said current part, said current part thus comprising a random data stream that is changed regularly, wherein said random selector is randomized by a previous segment of said regularly changing random data stream, thereby to allow said regularly changing random data stream to be available at any location at which said publicly available primary digital bitstream is available.

14. A random data generator for reproducing a random data stream producible by an identical generator at another location over a public electronic network, for sharing a random process between at least two separate parties in secret manner, based on a publicly available primary digital bitstream, said publicly available primary digital bitstream changing regularly, the generator being implemented on an electronic processor, the generator comprising:

an input configured for regularly receiving a current copy of a part of said publicly available primary digital bitstream, said publicly available primary digital bitstream being available in identical manner at a plurality of locations over said public electronic network, said publicly available primary digital bit stream being external to the locations and accessible via said public electronic network, a random selector configured for selecting said part, said part comprising random individual bits from said publicly available primary digital bitstream, therefrom to form a regularly changing random data stream, wherein said random selector is randomized by a previous part of said regularly changing random data stream, thereby to enable said random data stream to be available in identical manner at a plurality of locations over said public electronic network.

15. A random data generator according to claim 14, wherein said digital bitstream is at least part of a data exchange process between parties associated with said generators.

16. A random data generator according to claim 15, further comprising a synchronization check unit for adding data to said data exchange process to enable a remote party to determine that it is producing an identical random data stream.

17. A random data generator according to claim 16, further comprising a resynchronization unit operable to use for resyncbronization a predetermined earlier part of said random data stream upon receipt of an indication that said random data generator is not producing a random data stream that is identical to one being produced by said remote party.

18. A random data generator according to claim 17, wherein said resynchronization unit is operable to signal to said remote party upon carrying out said resynchronization.

19. A random data generator according to claim 18, wherein said resynchronization unit is operable to exchange said predetermined earlier part at predetermined intervals.

20. A random data generator according to claim 19, operable to define a gray area around said exchange, and within said gray area, to exchange control signals with said remote party to ensure that said parties use the same predetermined earlier part.

21. A method for secret sharing of a random process between at least two separate parties, said parties implemented on respective electronic processors, said sharing based on a publicly available source provided over a public electronic network the method comprising the steps of:

randomly selecting at each processor-implemented party in a selection operation a copy of a part of an available and regularly changing primary digital data bit stream, said regularly changing available primary digital data bit stream being external to the parties and available in identical manner at each party over said public electronic network, said randomly selected regularly changing copy to form a regularly changing random data source changing identically at each party, and using said regularly changing random data source to randomize said selection operation in an identical manner at each party, thereby to render said random process available in identical manner at each party over said public electronic network.

22. A method according to claim 21, wherein said primary data source is obtainable as a stream of bits from a data exchange process between said two parties.

23. A method according to claim 21, wherein said primary data source comprises a stream of data bits divisible into data units and comprising the step of selecting at random from the data bits of each data unit.

24. A method according to claim 23, wherein said bits in said data units are separately identifiable by an address, and comprising the step of selecting said bits by random selection of addresses.

25. A method according to claim 21, wherein said step of selecting is carried out by using identically set pseudorandom data generation at each party.

26. A method according to claim 21, further comprising the step of exchanging control data between said parties to enable each party to determine whether they are operating synchronously with said other party.

27. A method according to claim 26, wherein said control data includes any one of a group comprising:

redundancy check data of at least some of said random data source, and a hash encoding result of at least some of said random data source.

28. A method according to claim 26, comprising the further steps of determining from said control data that synchronization has been lost between the parties and regaining synchronization based on a predetermined earlier part of said random data source.

29. A method according to claim 28, further comprising a step of exchanging said data for regaining synchronization 30. A method according to claim 29, further comprising a step of storing previously exchanged data for regaining synchronization to be used for resynchronization with a party that has not made said exchange.

31. A system according to claim 29, further comprising a step of creating in advance future data to be used for resynchronization for resynchronizing with a party that has made said exchange in advance.

* * * * *